United States Patent
Martel et al.

(10) Patent No.: US 10,555,034 B2
(45) Date of Patent: *Feb. 4, 2020

(54) DIGITAL VIDEO RECORDER WITH ADDITIONAL VIDEO INPUTS OVER A PACKET LINK

(71) Applicant: Verint Americas Inc., Alpharetta, GA (US)

(72) Inventors: Hugo Martel, Montreal (CA); Charles Gregory Lampe, Silver Spring, MD (US); Louis Marchand, Montreal (CA); Jim Moran, Annapolis, MD (US)

(73) Assignee: Verint Americas Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/024,202

(22) Filed: Jun. 29, 2018

(65) Prior Publication Data

US 2018/0332344 A1 Nov. 15, 2018

Related U.S. Application Data

(63) Continuation of application No. 13/041,594, filed on Mar. 7, 2011, now Pat. No. 10,028,018.

(60) Provisional application No. 61/311,283, filed on Mar. 5, 2010.

(51) Int. Cl.
*H04N 21/44* (2011.01)
*H04H 60/59* (2008.01)

(52) U.S. Cl.
CPC ....... *H04N 21/44008* (2013.01); *H04H 60/59* (2013.01)

(58) Field of Classification Search
CPC ............... H04N 21/44008; H04N 7/18; H04N 21/2747; H04H 60/59
See application file for complete search history.

(56) References Cited

U.S. PATENT DOCUMENTS

| | | | |
|---|---|---|---|
| 5,862,342 A | 1/1999 | Winter et al. | |
| 6,226,384 B1 | 5/2001 | Cavallerano et al. | |
| 2001/0012383 A1* | 8/2001 | Kawai | G06F 3/121 382/114 |
| 2002/0003948 A1 | 1/2002 | Himeno et al. | |

(Continued)

*Primary Examiner* — Thai Q Tran
*Assistant Examiner* — Sunghyoun Park
(74) *Attorney, Agent, or Firm* — Christopher M. Scherer; DeWitt LLP

(57) ABSTRACT

What is disclosed is a video system. The video system includes a digital video recorder comprising a first camera interface configured to receive video captured from a first plurality of cameras, a packet interface configured to receive in a packet format video captured by a second plurality of cameras, and a storage system configured to store the video captured by the first plurality of cameras and the video captured by the second plurality of cameras. The video system also includes a video encoder coupled to the digital video recorder by a packet link, where the video encoder includes a second camera interface configured to receive video captured from the second plurality of cameras and an output interface configured to transfer in the packet format the video captured by the second plurality of cameras for delivery to the digital video recorder over the packet link.

19 Claims, 4 Drawing Sheets

(56) References Cited

U.S. PATENT DOCUMENTS

| | | |
|---|---|---|
| 2002/0018117 A1 | 2/2002 | Tosaya |
| 2002/0071654 A1* | 6/2002 | Notoya ............... H04N 9/8042 |
| | | 386/331 |
| 2002/0141732 A1 | 10/2002 | Reese et al. |
| 2003/0142745 A1 | 7/2003 | Osawa |
| 2003/0223733 A1 | 12/2003 | Chang |
| 2004/0128317 A1* | 7/2004 | Sull ..................... G11B 27/034 |
| 2004/0156623 A1 | 8/2004 | Kato et al. |
| 2004/0184531 A1 | 9/2004 | Lim et al. |
| 2005/0276264 A1 | 12/2005 | Cordero et al. |
| 2006/0092938 A1* | 5/2006 | Gentrix .................. H04L 29/06 |
| | | 370/390 |
| 2006/0184553 A1 | 8/2006 | Liu et al. |
| 2006/0200845 A1 | 9/2006 | Foster et al. |
| 2006/0236338 A1* | 10/2006 | Shimoda ............. G11B 27/105 |
| | | 725/37 |
| 2006/0238648 A1* | 10/2006 | Wogsberg ................ H04N 7/01 |
| | | 348/441 |
| 2007/0024705 A1 | 2/2007 | Richter et al. |
| 2008/0151884 A1 | 6/2008 | Elberbaum |
| 2008/0184245 A1 | 7/2008 | St-Jean |
| 2008/0184316 A1 | 7/2008 | Mori et al. |
| 2008/0235742 A1* | 9/2008 | Osaki ............... H04N 21/2387 |
| | | 725/100 |
| 2009/0185792 A1* | 7/2009 | Braunstein ............... H04N 5/77 |
| | | 386/239 |
| 2009/0245268 A1 | 10/2009 | Pugliese, IV |
| 2010/0097473 A1 | 4/2010 | Park et al. |
| 2011/0058035 A1 | 3/2011 | DeBerry et al. |

\* cited by examiner

DIGITAL VIDEO RECORDER WITH ADDITIONAL VIDEO INPUTS OVER A PACKET LINK

RELATED APPLICATIONS

This patent application is a continuation of U.S. application Ser. No. 13/041,594, filed Mar. 7, 2011, which application claims priority to U.S. Provisional Patent Application No. 61/311,283, filed Mar. 5, 2010, the contents of which are incorporated by reference in their entireties.

TECHNICAL FIELD

Aspects of the disclosure are related to the field of communications, and in particular, digital video processing and digital video recording devices operating over packet links.

TECHNICAL BACKGROUND

Digital video recorders capture video from video sources such as video cameras or television sources. In some examples, a digital video recorder is employed for video surveillance, and uses locally connected analog video cameras to capture video. The video captured from the video sources is typically stored on an internal storage system, such as a hard disk drive, for later retrieval by a user of the digital video recorders. However, digital video recorders used for video surveillance rely on analog video cameras connected locally to the digital video recorder, and thus are limited by cable lengths, signal attenuation, interference, and other factors of video signals. Thus, video surveillance conducted using these digital video recorders is typically limited to a single premises or building.

Overview

What is disclosed is a video system. The video system includes a digital video recorder comprising a first camera interface configured to receive video captured from a first plurality of cameras, a packet interface configured to receive in a packet format video captured by a second plurality of cameras, and a storage system configured to store the video captured by the first plurality of cameras and the video captured by the second plurality of cameras. The video system also includes a video encoder coupled to the digital video recorder by a packet link, where the video encoder includes a second camera interface configured to receive video captured from the second plurality of cameras and an output interface configured to transfer in the packet format the video captured by the second plurality of cameras for delivery to the digital video recorder over the packet link.

What is also disclosed is a method of operating a video system. The method includes, in digital video recorder, receiving video captured from a first plurality of cameras, receiving in a packet format video captured by a second plurality of cameras, and storing the video captured by the first plurality of cameras and the video captured by the second plurality of cameras. The method also includes, in a video encoder coupled to the digital video recorder by a packet link, receiving video captured from the second plurality of cameras and transferring in the packet format the video captured by the second plurality of cameras for delivery to the digital video recorder over the packet link.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
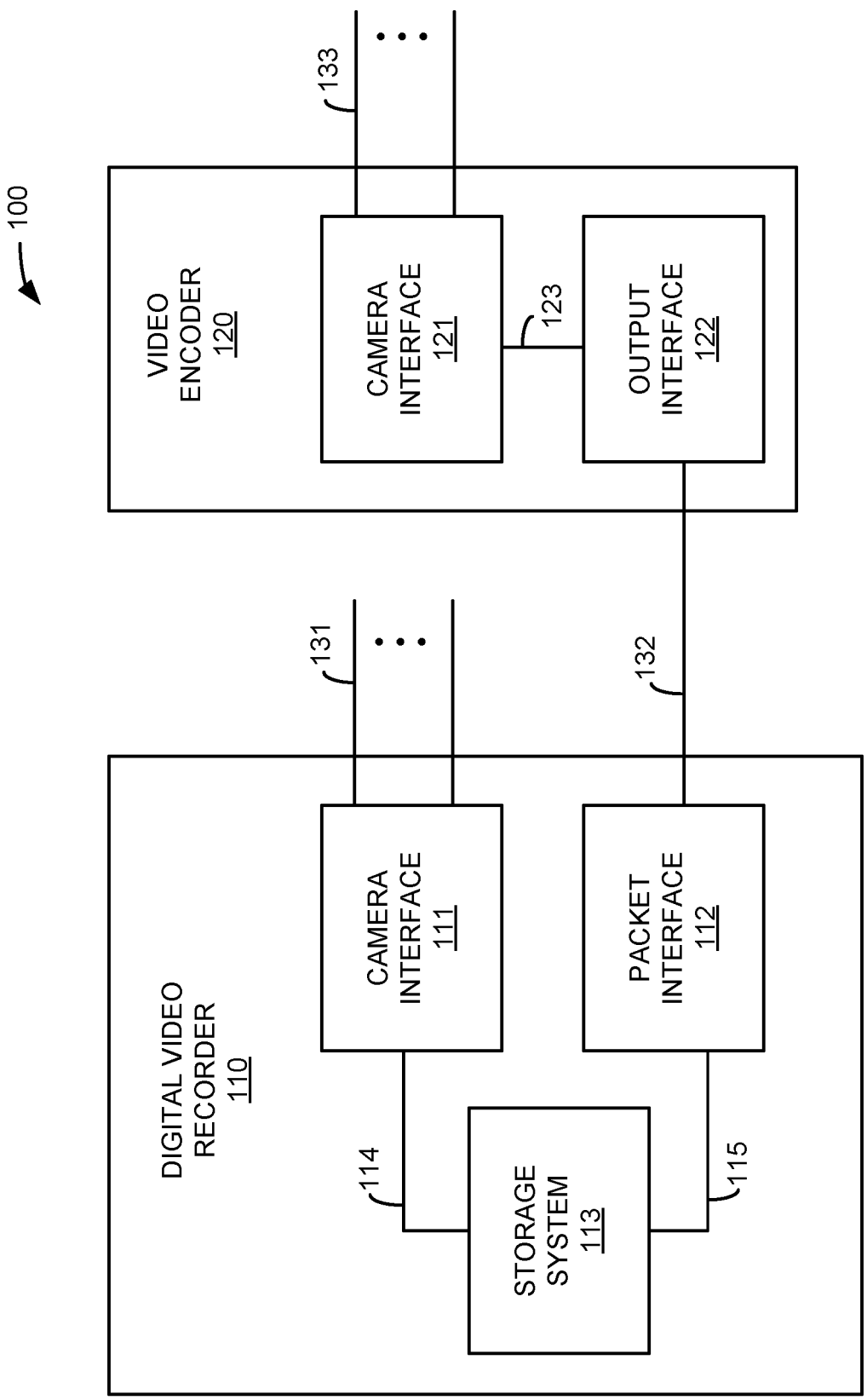
FIG. 1 is a system diagram illustrating a video system.

FIG. 1 is a system diagram illustrating video system 100. Video system 100 includes digital video recorder (DVR) 110 and video encoder 120. Digital video recorder 110 and video encoder 120 communicate over packet link 132. Digital video recorder 110 includes camera interface 111, packet interface 112, and storage system 113. Camera interface 111 and storage system 113 communicate over link 114. Packet interface 112 and storage system 113 communicate over link 115. Video encoder 120 includes camera interface 121 and output interface 122. Camera interface 121 and output interface 122 communicate over link 123.

Figure 2:
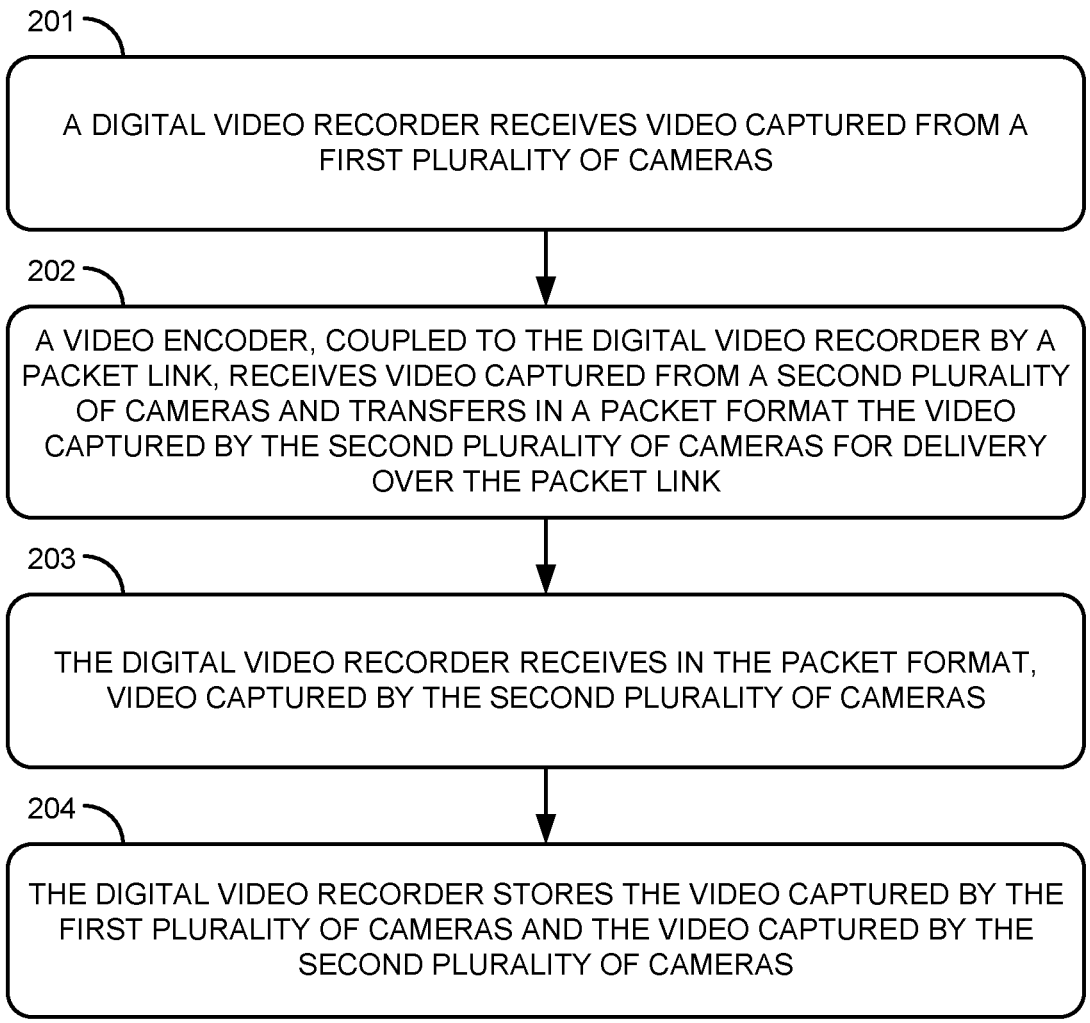
FIG. 2 is a flow diagram illustrating a method of operation of a video system.

FIG. 2 is a flow diagram illustrating a method of operating video system 100. The operations of FIG. 2 are referenced herein parenthetically. In FIG. 2, DVR 110 receives (201) video captured from a first plurality of cameras. In this example, camera interface 111 of DVR 110 receives and processes video from a plurality of cameras over links 131. In some examples, camera interface 111 receives analog video from cameras in an analog format, such as NTSC, PAL, RGB, or other analog video format. In examples where analog video is received from the cameras, camera interface 111 could encode the analog video into a digital format. In further examples, camera interface 111 could compress or encrypt the video into a digital format. In other examples, camera interface 111 receives digital video from cameras in a digital format, such as MPEG, H.264, JPEG video, or other digital video format. Although camera interface 111 receives video from cameras in this example, the cameras are not included in FIG. 1 for clarity. It should be understood that camera interface 111 receive video over links 131, respectively, from any number of cameras. In some examples, 16 cameras are coupled to camera interface 111, although a different number of cameras could be employed. The associated cameras could communicate with camera interface 111 over coaxial, wireline, wireless, optical, or other signaling media, including combinations thereof.

Video encoder 120 receives (202) video captured from a second plurality of cameras and transfers in a packet format the video captured by the second plurality of cameras for delivery over packet link 132. In this example, video encoder 120 and DVR 110 are coupled by packet link 132. Camera interface 121 of video encoder 120 receives and processes video from a plurality of cameras over links 133. In some examples, camera interface 121 receives analog video from cameras in an analog format, such as NTSC, PAL, RGB, or other analog video format. In examples where analog video is received from the cameras, camera interface 121 could encode the analog video into a digital format. In further examples, camera interface 121 could compress or encrypt the video into a digital format. In other examples, camera interface 121 receives digital video from cameras in a digital format, such as MPEG, H.264, JPEG video, or other digital video format. Although camera interface 121 receives video from cameras in this example, the cameras are not included in FIG. 1 for clarity. It should be understood that camera interface 121 receive video over links 133, respectively, from any number of cameras. In some examples, 16 cameras are coupled to camera interface 121, although a different number of cameras could be employed. The associated cameras could communicate with camera interface 121 over coaxial, wireline, wireless, optical, or other signaling media, including combinations thereof.

Output interface 122 receives video from camera interface 121 over link 123. In some examples, output interface 122 processes analog video received from camera interface 121 into a digital format, and processes the video in the digital format into a packet format for transfer over packet link 132 for delivery to DVR 110. In other examples, output interface 122 receives the video in a digital format from camera interface 121, and processes the video in the digital format into a packet format for transfer over packet link 132 for delivery to DVR 110. The packet format over which the video captured by the second plurality of cameras is transferred could include an Internet protocol (IP) packet format or an Ethernet packet format, among other packet formats, including combinations thereof.

DVR 110 receives (203) in the packet format video captured by the second plurality of cameras. Packet interface 112 of DVR 110 receives the video in the packet format over packet link 132. Packet link 132 could include an IP link, Ethernet link, or other packet link, and could be transported over a packet network, such as a local area network (LAN) or the Internet, among other networks. Packet interface 112 then transfers the video received over packet link 132 over link 115 to storage system 113. Although in this example, the video received in the packet format is captured by cameras associated with camera interface 121 of video encoder 120, and transferred in a packet format by output interface 122 of video encoder 120 over packet link 132, in further examples, DVR 110 could include multiple packet interfaces for receiving video from multiple video encoders.

DVR 110 stores (204) the video captured by the first plurality of cameras and the video captured by the second plurality of cameras. The video captured by the first plurality of cameras is transferred by camera interface 111 over link 114 to storage system 113. In some examples, storage system 113 receives analog video from camera interface 111 and video in a packet format from packet interface 112. In other examples, storage system 113 receives digital video from camera interface 111 and video in a packet format from packet interface 112. In further examples, storage system 113 digitizes analog video received from camera interface 111. In yet further examples, storage system 113 changes the format, frame rate, or resolution of the video received from camera interface 111 or the video received in the packet format from packet interface 112 before storing the video on the storage media.

Figure 3:
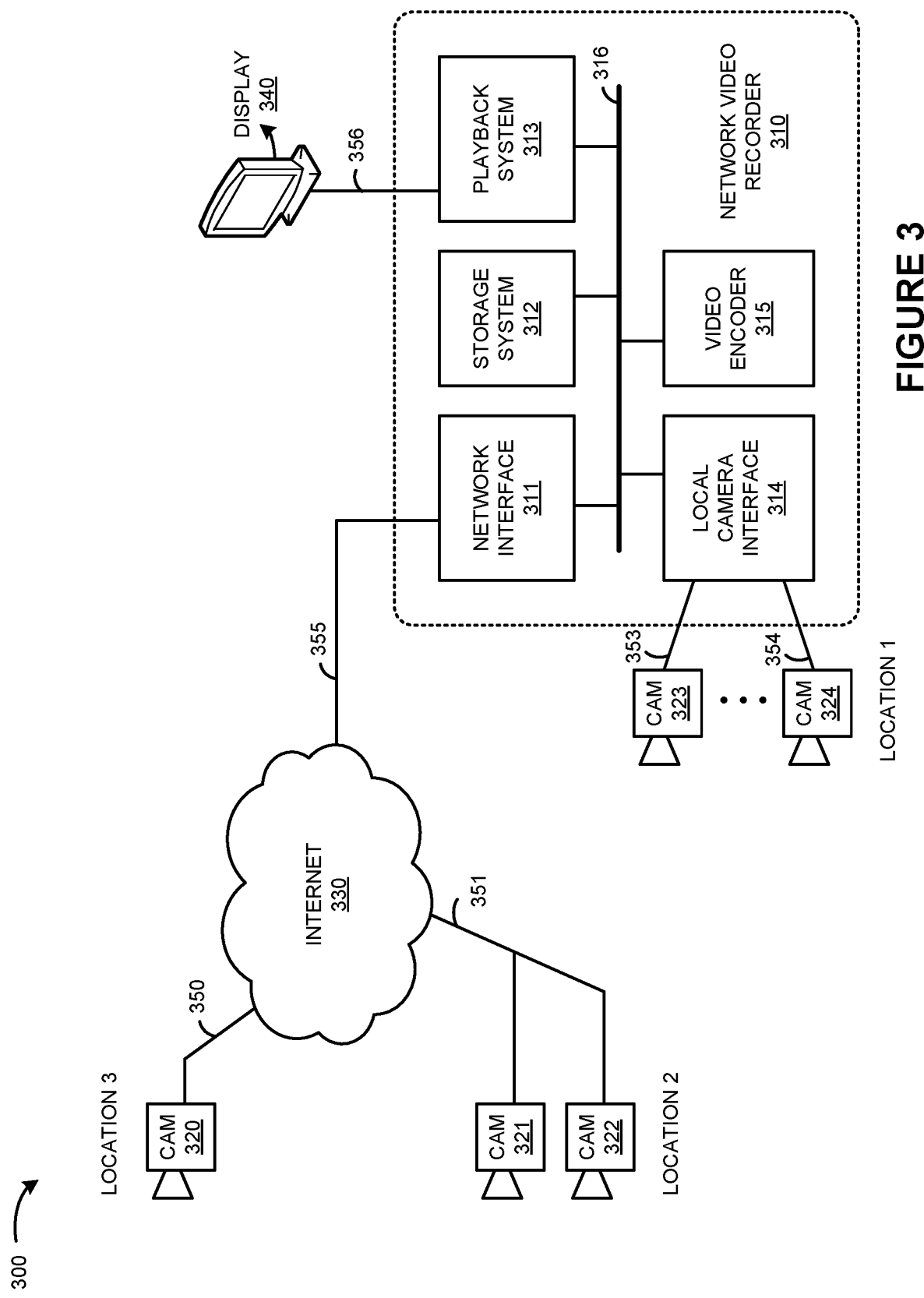
FIG. 3 is a system diagram illustrating a video system.

FIG. 3 is a system diagram illustrating video system 300. Video system 300 includes network video recorder (NVR) 310, cameras 320-324, Internet 330, and display 340. NVR 310 and Internet communicate over packet link 355 which is an Internet protocol (IP) link in this example. NVR 310 and display 340 communicate over link 356 which is a VGA graphics link in this example. NVR 310 and cameras 323-324 communicate over analog NTSC links 353-354, respectively. Camera 320 and Internet 330 communicate over link 350, which is an IP link in this example. Cameras 321-322 and Internet 330 communicate over link 351, which is an IP link in this example. It should be understood that links 316 and 350-356 could employ similar features as links 114-115, 123, and 131-133 in FIG. 1.

NVR 310 includes network interface 311, storage system 312, playback system 313, local camera interface 314, video encoder 315, and bus 316. NVR 310 could be an example of DVR 110 in FIG. 1, although DVR 110 could use other configurations. Network interface 311 comprises a network interface card (NIC) and associated transceiver circuitry for communicating over a packet link, such as IP link 355. In further examples, network interface 311 could include an RJ-45, Ethernet 10/100/1000 Base-T, or other network interface. Storage system 312 includes a computer-readable storage medium, which could include a hard disk drive, a solid state drive, an array of drives, optical drives, a universal serial port (USB) storage device, or a redundant array of independent disks (RAID) system. In further examples, storage system 312 includes circuitry for a local or remotely managed video export on a USB key or a DVD-RW. Playback system 313 includes circuitry to display video captured by video cameras or stored on storage system 312 to a user of NVR 310. Playback system 313 could include a VGA, DVI, NTSC, PAL, RGB, BNC, or other video interface or format, and could provide video live video playback of the video captured by the various video cameras. Playback system 313 could provide both live video and stored video simultaneously to a user of NVR 310. Local camera interface 314 includes circuitry and equipment to interface with analog video cameras in an NTSC format, and could include impedance matching circuitry, filters, amplifiers, transceivers, and cable connectors. Video encoder 315 includes circuitry to convert the video received in an analog format by local camera interface 314 to a digital format for storage in storage system 312. Video encoder 315 includes analog-to-digital conversion circuitry, amplifiers, filters, buffers, or other video processing circuitry. Bus 316 includes a common bus for communications between the elements of NVR 310, which could include elements for transferring video data, power, control signals, or other information.

Cameras 320-322 comprise IP cameras in this example. Cameras 320-322 capture video in an analog format and convert the video in the analog format to video in a digital format. The video in the digital format is then packetized by the associated one of cameras 320-322, and transferred for delivery over the associated packet link 350-351. The analog format could include NTSC, PAL, RGB, analog CIF, or another analog format, including combinations, improvements, or variations thereof. The digital format could include MPEG, H.264, JPEG video, digital CIF, or some other digital video format, including combinations, improvements, or variations thereof. In this example, each of cameras 320-322 include a camera interface and output interface, such as described for video encoder 120 in FIG. 1. Cameras 320-322 could be video cameras associated with automated teller machines (ATM), point-of-sale (PoS) devices, bank teller locations, or alarm systems, among other locations and equipment.

Cameras 323-324 comprise analog video cameras in this example. Cameras 323-324 capture video in an analog format and transfer the video over electrical signals, such as a BNC connector or coaxial cable link carrying NTSC signals. Although the analog format in this example is the NTSC format, in other examples the analog format could include PAL, RGB, analog CIF, or another analog format, including combinations, improvements, or variations thereof. It should be understood that cameras 323-324 could capture video in a digital format, such as using a CCD image sensor, CMOS image sensor, or megapixel sensor, and convert the captured image data into an analog format or a digital format as described herein. Cameras 323-324 could include video cameras associated with automated teller machines (ATM), point-of-sale (PoS) devices, bank teller locations, or alarm systems, among other locations and equipment. NVR 310 could provide power for cameras 323-324 over links 353-354.

Figure 4:
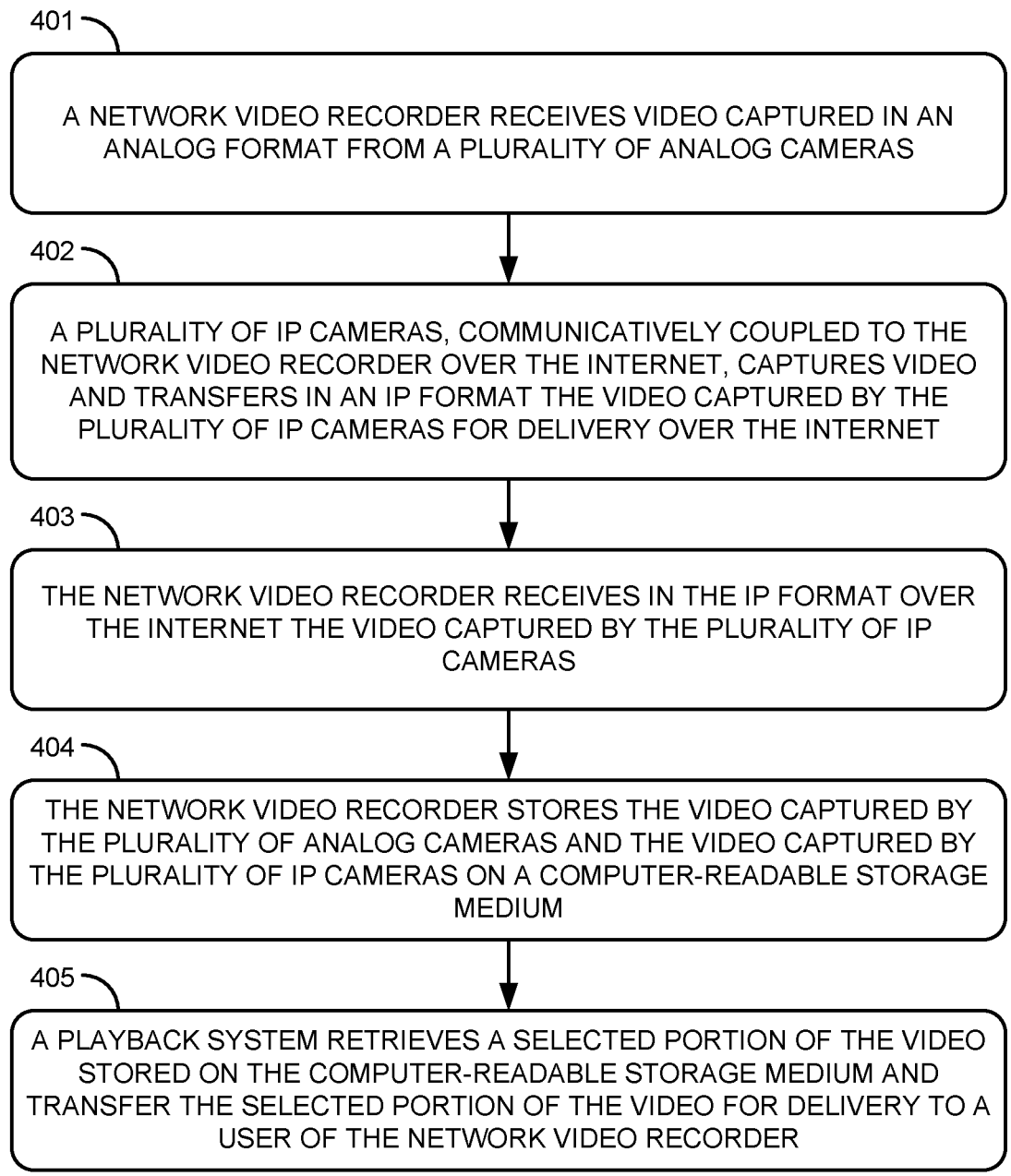
FIG. 4 is a flow diagram illustrating a method of operation of a video system.

FIG. 4 is a flow diagram illustrating a method of operating video system 300. The operations in FIG. 4 are referenced herein parenthetically. In FIG. 4, network video recorder (NVR) 310 receives (401) video captured in an analog format from a plurality of analog cameras. In this example, the plurality of analog cameras includes cameras (CAM) 323-324. A different number of analog-output video cameras could be employed. In this example, the video is captured by each of cameras 323-324 by an image sensor and converted into an analog format for delivery over the associated video link 353-354. Local camera interface 314 receives the video in the analog format over video links 353-354 and transfers the video for delivery to video encoder 315 over bus 316. Local camera interface 314 could process the analog video, such as by amplifying, filtering, reconditioning, or attenuating the video in the analog format. In some examples, local camera interface 314 transfers the video directly to video encoder 315 over analog signal lines, and does not transfer the analog video over bus 316. Once the video in the analog format is received by video encoder 315, video encoder 315 converts the video in the analog format to video in a digital format, where the digital format could include any of the digital formats discussed herein. In further examples, video encoder 315 comprises a video encoder integrated circuit or circuits, which could include analog-to-digital converters, amplifiers, filters, buffers, compression circuitry, encryption circuitry, or other circuitry. Video encoder 315 then transfers the video in the digital format over bus 316 for delivery to storage system 312 or playback system 313.

A plurality of IP cameras, communicatively coupled to NVR 310 over Internet 330, captures (402) video and transfer in an IP format the video captured by the plurality of IP cameras for delivery over Internet 330. In this example, the plurality of IP cameras includes cameras (CAM) 320-322. A different number of IP video cameras could be employed. In this example, the video is captured by each of cameras 320-322 by an image sensor and converted into an IP format for delivery over the associated IP link 350-351. In this example, camera 321 and camera 322 share an IP link, namely IP link 351. The video in the IP format captured by each of cameras 321-322 could be combined into a single IP link using a network hub, switch, server, or router. The video in the IP format transferred by each of cameras 320-322 is transported over Internet 330 for receipt by network interface 311. Appropriate network addressing, such as IP addresses, could be employed in the IP packet format to ensure delivery to network interface 311. In some examples, tunnels could be employed over each of links 350-351 and link 355, or between each of cameras 320-322 and network interface 311, for transporting the video in the IP packet format over Internet 330.

NVR 310 receives (403) in the IP format over Internet 330 the video captured by the plurality of IP cameras. In this example, network interface 311 receives the video in the IP format over IP link 355 and transfers the video for delivery to storage system 312 or playback system 313 over bus 316. In some examples, network interface 311 converts the video in the IP format to another format, such as a non-packet format or digital format as discussed herein. In further examples, network interface 311 includes buffer circuitry to reduce jitter or breaks in the receipt of the IP video over link 355. Network interface 311 could include a programmable packet throttling feature which would limit the packet quantity or bandwidth for each video camera over link 355.

NVR 310 stores (404) the video captured by the plurality of analog cameras and the video captured by the plurality of IP cameras on a computer-readable storage medium. In this example, storage system 312 receives video from video encoder 315 and from network interface 311 that was captured by the associated video cameras. Storage system 312 includes a computer-readable storage medium in this example, such as a hard disk drive, solid-state memory device, optical storage system, or other computer-readable media, and could include an array of computer-readable storage media, such as a RAID array. Storage system 312 could receive the video in different digital video formats, packet formats, or other video formats, and store the video as received on the computer-readable storage medium. In other examples, storage system 312 changes the format of the video into a common video format, a non-packet format, or other digital format as discussed herein prior to storage on the computer-readable storage medium. Storage system 312 could include other data with the stored video, such as metadata including timestamps, time codes, camera identifiers, video format information, camera location information, trigger information, alert information, or camera scene information, among other information. Storage system 312 could allow a user of NVR 310 to set different resolutions, frame rates, and image retention features of the video prior to storage on the computer-readable medium. The features could be selected by a user of NVR 310 over a user interface as discussed herein.

Playback system 313 retrieves (405) a selected portion of the video stored on the computer-readable storage medium and transfers the selected portion of the video for delivery to a user of NVR 310. Playback system 313 communicates with storage system 312 to access the video stored on the computer-readable medium of storage system 312. Storage system 312 retrieves the video stored on the computer-readable medium and transfers the video over bus 316 for delivery to playback system 313. Playback system 313 receives the video and transfers the video for display to a user of NVR 310. Playback system 313 could also receive metadata, such as discussed in operation 404, for association and transfer with the video for display to a user. In this example, playback system 313 transfers the video over link 356, which is a VGA graphics link connected to display 340. Display 340 could comprise a television, video monitor, computer monitor, computer display, or other video display device. In further examples, a user of NVR 310 requests selected video over a user interface of NVR 310, such as a keyboard, mouse, control panel, or other user interface associated with NVR 310 or through display 340. Playback system 313 would responsively transfer the requested video over link 356. In some examples, a composite view of multiple video cameras or video data could be transferred over link 356, such as examples including four camera views. Playback system 313 could combine video data from multiple cameras or from a single camera, including video captured over multiple timeframes, into a multi-video view. Playback system 313 could incorporate the metadata into the video data for transfer over link 356, such as including camera names, camera scenes, camera locations, time codes, or other data in the video associated with a particular video camera. Playback system 313 could convert the video received over bus 316 into a video or display format compatible with link 356 and display 340, such as a VGA, DVI, RGB, NTSC, PAL, or other video format. Playback system 313 could modify the video to different resolutions or frame rates for display to a user of NVR 310.

In further examples, playback system 313 receives live video from any of network interface 311 or video encoder 315 for displaying to a user of NVR 310. The live video could be received before the associated video is stored by storage system 312. The live video could be transferred by any of network interface 311 or video encoder 315 in parallel with transferring the video for storage by storage system 312. Bus 316 could carry both live video and video to be stored. Playback system 313 could transfer the live video over display link 356 for display on display 340, and could include similar metadata information or video scene combining as discussed in operation 405 above. Playback system 313 could combine live video with video retrieved from storage system 312 into composite views for display 340. In yet further examples, playback system 313 could retrieve video stills, such as individual video frames, images, or other video portions for display to a user of NVR 310.

In yet further examples, NVR 310 could include a user interface, such as a control panel, keyboard, mouse, touchscreen, microphone, or other user interface for receiving command and control instructions from a user of NVR 310. The user interface could be provided over a network link, such as over IP link 355 by network interface 311. The user interface provides a user of NVR 310 a way to select video for viewing, to control a playback sequence of video from NVR 310, or to specify recording and capture parameters, such as alerts, alarms, or other parameters. The user interface of NVR 310 could allow a user to find images and transactions by time, time interval (at-a-glance views), date, number, transaction, or event. Users could also search for and view video by time, date, transaction, or event. The user interface could also provide day-at-a-glance, week-at-a-glance, and motion-based searches help users quickly pinpoint video of interest. The user interface could also provide remote access to live and recorded video, system setup, and internal DVR logs for system, operational, and configuration information. NVR 310 could also include equipment and circuitry to allow enterprise-wide NVR viewing of video, such as over a network link. NVR 310 could also include triggering features, such as alarms, event-based recording, event-based triggers, or other triggers to enable recording or storage of video, alert users of NVR 310. The event-based triggers could include settings for camera input, schedules, and recording, such as recording start/stop triggers, and could also include programmable events and scheduling, or settings for general recording, motion-triggered recording, and event-triggered recording. NVR 310 could include independent storage settings for alarms, such as using colorcoded file and search structures. NVR 310 could also include audio input/output, capable of playing back pre-recorded messages. The audio input/output could also include audio input associated with the captured video, and audio output during playback of the video. The audio information could be stored along with the video, such as in a multimedia format described herein. NVR 310 could also include user controls for moving the associated video cameras according to pan, tilt, and zoom commands, such as receiving commands over a serial communications port, or other network link.

Referring back to FIG. 1, camera interfaces 111 and 121 each include circuitry and equipment to receive and process video from a plurality of cameras. Camera interfaces 111 and 121 could each comprise transceivers, amplifiers, impedance matching circuitry, connectors, analog-to-digital converters, video processors, buffers, filters, video compression processors, video encoding processors, or other circuitry and equipment.

Packet interface 112 includes circuitry and equipment to receive video in a packet format over packet link 132. Packet interface 112 could comprise network interface equipment such as routers, gateways, buffers, network interface cards (NIC), packet processing equipment, or other systems and equipment, including combinations thereof.

Output interface 122 includes circuitry and equipment to transfer video in a packet format over packet link 132. Output interface 122 could comprise network interface equipment such as routers, gateways, network interface cards (NIC), buffers, packet processing equipment, or other systems and equipment, including combinations thereof.

Storage system 113 includes storage media to store video received from camera interface 111 and received from camera interface 121 though packet interface 112. Storage system 113 could comprise a computer-readable medium such as a disk, tape, integrated circuit, server, or some other memory device, and also may be distributed among multiple memory devices.

Camera links 131 and 133 each use metal, glass, optical, air, space, or some other material as the transport media. Camera links 131 and 133 could each use various analog or digital video formats, such as NTSC, PAL, MPEG, H.264, JPEG video, or some other video format, including combinations, improvements, or variations thereof.

Links 114-115 and 123 each comprise a physical, logical, or virtual communication link, capable of communicating video, video packets, data, control signals, and communications, along with other information. In some examples, links 114-115 and 123 each carry power. Links 114-115 and 123 may each be a software or logical link. In other examples, links 114-115 and 123 each use various communication media, such as air, space, metal, optical fiber, or some other signal propagation path, including combinations thereof. Links 114-115 and 123 each could be direct links or might include various equipment, intermediate components, systems, and networks.

Packet link 132 uses metal, glass, optical, air, space, or some other material as the transport media. Packet link 132 could use various packet protocols or formats, such as Internet Protocol (IP), Ethernet, asynchronous transfer mode (ATM), synchronous optical networking (SONET), Wireless Fidelity (WiFi), wireless telephony, or some other communication format, including combinations, improvements, or variations thereof.

Links 131-133 may each include many different signals sharing the same link—as represented by the associated lines in FIG. 1—comprising channels, forward links, reverse links, user communications, communication sessions, frequencies, carriers, timeslots, transportation ports, logical transportation links, network sockets, packets, or communication directions. Links 131-133 could each be direct links or may include intermediate networks, systems, or devices.

DVR 110 and video encoder 120 could also each include a processing system which retrieves and executes software from a computer-readable medium. In further examples, the associated processing systems each comprise specialized circuitry, and any software or computer-readable medium could be included in the specialized circuitry to operate the processing systems. The associated computer-readable medium could include a disk, tape, integrated circuit, server, or some other memory device, and also may be distributed among multiple memory devices. The associated software may include an operating system, logs, utilities, drivers, networking software, video processing software, and other software typically loaded onto a computer system. The associated software could contain an application program, firmware, or some other form of computer-readable processing instructions. When executed by the associated processing system, the software directs the processing system to operate as described herein.

FIGS. 1-4 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a video system, the method comprising:
    outputting, by a first group of analog cameras, analog video;
    outputting, by other groups of cameras, video, wherein each of the other groups is located remote from the first group;
    receiving and encrypting, by a first camera interface of a digital video recorder, the analog video output by the first group of analog cameras;
    receiving, by an at least one packet interface of the digital video recorder, video in a packet format from a packet link;
    storing, by a storage system located within the digital video recorder, video from the first analog camera interface and from each of the packet interfaces, wherein the storage system converts from the packet format to a common video format and stores the video corresponding to the video output by the other groups of cameras;
    receiving, by a second camera interface of a video encoder, the video output by the other groups of cameras;
    processing, by an output interface of the video encoder, the video from the other groups of cameras into the packet format; and
    transferring, by the output interface of the video encoder, the video from the other groups of cameras in the packet format to the digital video recorder over the packet link.

2. The method of claim 1, wherein receiving the video captured from other groups of cameras comprises receiving in a digital format the video captures from the other groups of cameras.

3. The method of claim 1, wherein receiving the video captured from other groups of cameras comprises receiving in an analog format the video captures from the other groups of cameras.

4. The method of claim 3, wherein the method further comprises encrypting, by the second camera interface, the analog video output by the other groups of cameras.

5. The method of claim 3, wherein the method further comprises encoding, by the second camera interface, the analog video output by the other groups of cameras.

6. The method of claim 3, wherein the method further comprises processing, by the output interface, the analog video received from the second camera interface of the video output by the other groups of cameras.

7. The method of claim 1, wherein the packet format comprises an Internet protocol (IP) packet format.

8. The method of claim 1, wherein the packet link comprises a packet link over the Internet.

9. The method of claim 1, wherein the packet link comprises a wireless packet link.

10. The method of claim 1, wherein the storing comprises storing, in a selected frame rate, the video corresponding to (1) the video from the first plurality of analog cameras and (2) the video from the packet link.

11. The method of claim 1, further comprising:
    retrieving, by a playback system, a selected portion of the video stored by the storage system and displaying the selected portion of the video to a user of the digital video recorder.

12. The method of claim 1, further comprising:
    displaying, by a playback video from one or more of a day-at-a-glance, a week-at-a-glance, and a motion-based search of the stored video.

13. A video system comprising:
    a first group of analog cameras outputting analog video;
    other groups of analog cameras outputting analog video, wherein each of the other groups is located remote from the first group of analog cameras;
    a digital video recorder comprising:
        a first analog camera interface receiving analog video from each of the analog cameras in the first group via a different analog link,
        packet interfaces, wherein each packet interface receives video in a packet format from a different packet link,
        a storage system located within the digital video recorder and storing video from the first analog camera interface and from each of the packet interfaces;
    a playback system receiving a selected portion of the video stored by the storage system and displaying the selected portion of the video to a user of the digital video recorder;
    a graphical user interface configured to allow the user to select video stored by the storage system for playback; and
    video encoders, wherein each video encoder is coupled to the digital video recorder by a different packet link and wherein each video encoder comprises:
        a second analog camera interface receiving analog video from each of the analog cameras in one of the other groups via a different analog link, and
        an output interface processing the received analog video into a packet format and transmitting the video in packet format over a packet link connecting the output interface and one of the digital video recorder's packet interfaces, wherein the storage system converts from a packet format to a common video stores in a non-packet format and stores the video corresponding to the analog video output by the other groups of analog cameras.

14. The video system of claim 13, further comprising: a playback system displaying video from one or more of a day-at-a-glance, a week-at-a-glance, and a motion-based search of the stored video.

15. The video system of claim 13, wherein the playback system presents live video captured by the first group of analog cameras simultaneously to the selected portion of the video stored by the storage system.

16. The video system of claim 13, wherein the playback system presents live video captured by the other groups of cameras simultaneously to the selected portion of the video stored by the storage system.

17. The video system of claim 13, wherein the user interface further allows the user to select live video for play back captured by either the first group of analog cameras or by the other groups of cameras.

18. The video system of claim 13, wherein the user interface further allows the user to set criteria for the storage system in saving the video from the first group of analog cameras and video from the other groups of cameras.

19. The video system of claim 18, wherein the criteria include different resolutions, frame rates, and image retention features.

\* \* \* \* \*